US007106029B2

(12) United States Patent
Inokuchi et al.

(10) Patent No.: US 7,106,029 B2

(45) Date of Patent: Sep. 12, 2006

(54) VEHICLE GENERATOR AND VEHICLE GENERATING SYSTEM

(75) Inventors: Takatoshi Inokuchi, Kariya (JP); Fuyuki Maehara, Nagoya (JP); Tadatoshi Asada, Anjo (JP)

(73) Assignee: Denso Corporation, Kariya (JP)

( * ) Notice: Subject to any disclaimer, the term of this patent is extended or adjusted under 35 U.S.C. 154(b) by 54 days.

(21) Appl. No.: 11/063,848

(22) Filed: Feb. 23, 2005

(65) Prior Publication Data

US 2005/0206350 A1 Sep. 22, 2005

(30) Foreign Application Priority Data

Mar. 16, 2004 (JP) ............................ 2004-073888

(51) Int. Cl.
*H02P 9/00* (2006.01)

(52) U.S. Cl. ............................ 322/28; 322/24; 322/25

(58) Field of Classification Search .................. 322/24, 322/25, 28, 27, 37; 363/89, 52
See application file for complete search history.

(56) References Cited

U.S. PATENT DOCUMENTS 5,581,172 A * 12/1996 Iwatani et al. ................ 322/28
5,637,986 A * 6/1997 Kanazawa et al. ............ 322/28
5,694,311 A * 12/1997 Umeda et al. ................ 363/89
5,731,689 A * 3/1998 Sato ........................... 322/25
5,754,030 A * 5/1998 Maehara et al. .............. 322/19
6,271,649 B1 * 8/2001 Iwatani ........................ 322/29
6,700,353 B1 * 3/2004 Asada ......................... 322/28
6,812,675 B1 * 11/2004 Okamoto et al. ............. 322/28

FOREIGN PATENT DOCUMENTS

JP A 56-001736 1/1981
JP A 02-197299 8/1990
JP A 10-210796 8/1998
JP A 2003-074388 3/2003

* cited by examiner

*Primary Examiner*—Nicholas Ponomarenko
(74) *Attorney, Agent, or Firm*—Oliff & Berridge, PLC

(57) ABSTRACT

A vehicle generating system includes a generator for a vehicle, a voltage regulator that supplies field current to the field coil at a variable duty ratio, a field current sensor that detects field current amount, a signal transmitting circuit that transmits a signal representing the detected field current amount and the duty ratio and an electronically controlling unit that receives the signal representing the detected field current amount and the duty ratio and controls the engine according to one of the detected field current amount and the duty ratio.

6 Claims, 6 Drawing Sheets

LOAD
SENSOR
WARN
V-SET
FC-SET
DRIVER
TRANS
V-DET
CUR
CURRENT
I/O
ABNOR
E-POWER
TEMPER
1
2
3
4
5
6
7
9
10
11
12
13
14
15
16
17
18
19
21
22
23
24
25
26
27
31
32
33
34
35

SENSOR
MAIN
TR-RE
TR-RE
I/O
ABNOR
E-POWER
TEMPER

VEHICLE GENERATOR AND VEHICLE GENERATING SYSTEM

CROSS REFERENCE TO RELATED APPLICATION

The present application is based on and claims priority from Japanese Patent Application 2004-73888, filed Mar. 16, 2004, the contents of which are incorporated herein by reference.

BACKGROUND OF THE INVENTION

1. Field of the Invention

The present invention relates to a vehicle generator and a generating system that includes the vehicle generator.

2. Description of the Related Art

A vehicle generator has been used for charging battery and supplying electric power to various electric loads such as head lamps.

Such a vehicle generator includes an armature coil, a field coil, a voltage regulator, etc.

The voltage regulator usually employs a duty ratio control circuit that controls field current supplied to the field coil through a switch element. For this purpose, a target output power to be supplied to the electric loads and the battery and a target field current are calculated to provide a suitable duty ratio, which controls the switch element to supply the field coil a suitable amount of field current.

In such a vehicle generator, changes in amount of the field current may be useful for various controls or examinations. For example: disconnection or short-circuiting of the field coil can be detected by comparing the amount of the field current with a preset value; and engine power can be controlled by detecting the amount of the field current because the field current is closely related to the output torque and the rotation speed of the vehicle generator.

However, when the demand of electric power sharply changes in such a case that a heavy electric load is connected or disconnected, the battery may be overcharged, or the electric loads may be oversupplied even if a detected amount of the field current is in a normal level.

JP-A-Hei 2-197299 and JP-A-Sho 56-1736 respectively disclose methods of detecting battery overcharging. However, such an abnormality can not be detected until a considerable time has passed. Even if the abnormality is detected, such a method does not tell whether the abnormality is caused by the field coil or not.

SUMMARY OF THE INVENTION

Therefore, an object of the invention is to provide a reliable vehicle generator that can always operate without the above described problem.

According to a preferred embodiment of the invention, a generator for a vehicle includes a voltage regulator that supplies field current to the field coil at a variable duty ratio, a field current sensor that detects field current and a signal transmitting circuit that transmits a signal representing the detected field current and the duty ratio. Therefore, various control can be carried out more accurately and speedier by using not only the data of the field current data but also the data of the duty ratio.

In the above generator, the signal transmitting circuit may include a serial signal transmitting circuit that transmits a composite signal representing the detected field current and the duty ratio. Therefore, the composite signal can be transmitted via a single transmission line.

According to another preferred embodiment of the invention, a vehicle generating system includes, in addition to the above described generator, an electronically controlling unit (ECU) that receives the signal representing the detected field current and the duty ratio and controls the engine according to one of the detected field current and the duty ratio. The generating system may include an abnormality detecting circuit that provides a warning signal if the field current and the duty ratio indicate an abnormality. The electronically controlling unit may include a first engine power control process that controls engine power according to the duty ratio and a second engine power control process that controls the engine power according to the field current and means for switching the first and second engine power control processes from one to the other according to the demand or condition of electric power supply. The above described vehicle generating system may include a generator temperature measuring circuit according to the field current and the duty ratio.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

DETAILED DESCRIPTION OF THE PREFERRED EMBODIMENTS

A vehicle generator 1 according to the first embodiment of the invention, which is mounted in an engine compartment of a vehicle, will be described with reference to FIGS. 1–6.

Figure 1:
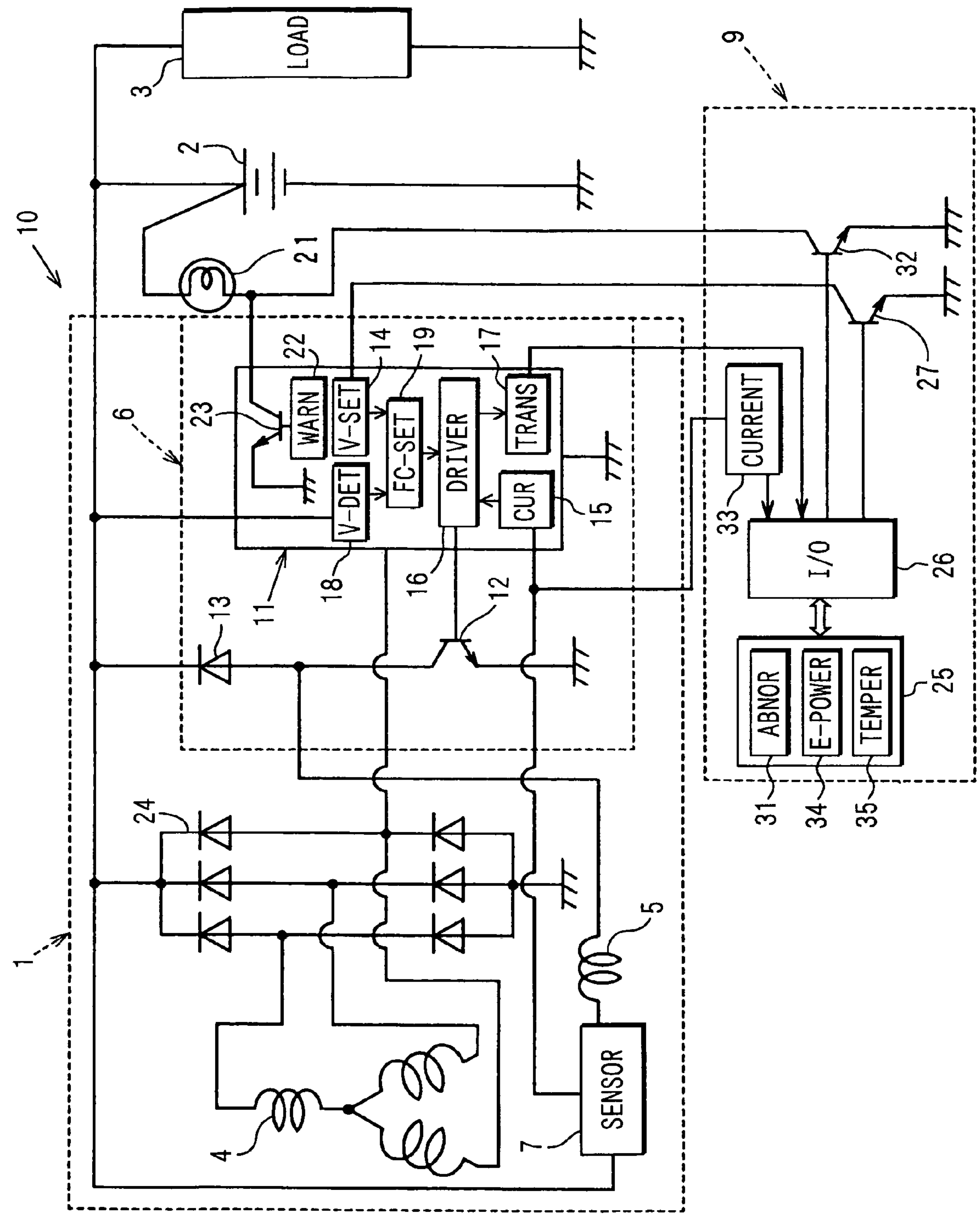
FIG. 1 a circuit diagram illustrating an overall structure of a vehicle generator according to the first embodiment of the invention.

As shown in FIG. 1, the vehicle generator 1 according to the first embodiment is connected to a battery 2 and an electric load 3 such as head lamps. The vehicle generator 1 includes an armature coil 4 mounted in a cylindrical stator (not shown) and a cylindrical field coil 5 mounted in a rotor (not shown), a voltage regulator (or an output power control unit) 6, a field current sensor element 7, etc. The vehicle generator 1 forms a generator system 10 together with an electronically control unit (hereinafter referred to ECU) 9.

The field coil 5 forms a part of the rotor. The rotor includes a Lundell type rotor core and the field coil 5, which is wound around the center of the rotor core. The armature coil 4 includes three phase windings, which generates output power of three-phase-voltage. The armature coil 4 and the stator core form a stator (not shown). The field coil provides a magnetic field so that the field coil 5 on the rotor supplies a rotating magnetic field to the armature coil 4 to generate three-phase ac power.

The voltage regulator 6 includes a control circuit 11, a transistor 12 that turns on or off according to the driving signal to control the field current and a flywheel diode 13.

The field current sensor element 7 is a well-known sensor element that detects actual amount of the field current.

The control circuit 11 is a circuit to compare an actual level of the output voltage and a set level of the output voltage sent from the ECU 9 and to provide a field current control signal or transistor driving signal (hereinafter referred to as driving signal) that controls the transistor 12 to turn on or off so that the actual level of the output voltage can be equal to the set level according to a command signal sent from the ECU 9. The control circuit 11 includes a command output voltage setting circuit 14, an actual field current detecting circuit 15, a driver circuit 16, a duty ratio signal transmitting circuit 17, an actual output voltage detecting circuit 18, a command field current setting circuit 19, a warning circuit 22 having a warning lamp 21, a transistor 23 that operates the warning lamp 21, etc.

The command output voltage setting circuit 14 sets a command level of the output voltage according to the set level of the output voltage sent from the ECU 9.

The actual field current detecting circuit 15 provides a field current signal that represents an actual amount of the field current based on a signal sent from the field current sensor element 7. The field current signal is a digital code signal.

The driver circuit 16 receives an actual field current signal from the actual field current detecting circuit 15 and a command field current signal from the command field current setting circuit 19. The driver circuit 16 adjusts the duty ratio so that the amount of the actual field current equals to a set amount of the field current. The driving signal is given to the transistor 12. The transistor 12 turns on or off the field current supplied from the battery 2 to the field coil 5 in synchronism with the driving signal.

The duty ratio signal transmitting circuit 17 receives a signal representing an actual duty ratio of the driving signal and provides a digital-coded field current control signal based on the actual duty ratio of the driving signal.

The actual output voltage detecting circuit 18 detects an actual level of the output voltage. The command field current setting circuit 19 is mainly composed of a comparator that compares an actual level of the output voltage detected by the actual output voltage detecting circuit 18 with a command level of the output voltage provided by the command output voltage setting circuit 14. The command field current setting circuit 19 sets the next target amount of the field current based on the output signal of the comparator.

Incidentally, the three-phase ac power generated in the armature coil 4 is converted into dc power by a rectifier unit 24.

The ECU 9 includes a CPU 25 which is composed of a microcomputer (not shown), an I/O circuit 26, transistors 27, 32, a current detecting circuit 33, etc. The ECU 9 provide signals for controlling the generator 1 and the engine when it receives signals from the voltage regulator 6 and other detecting circuits. The ECU 9 sends voltage regulator 6 the target level of the output voltage via the transistor 27 and operates the warning lamp 21 via the transistor 32 if it receives a warning signal from an abnormality detecting circuit 31, which is included in the CPU 25. The current detecting circuit 33 inputs a signal representing the actual amount of field current, which is sent from the regulator 6, to the CPU 25.

The CPU 25 sets a target level of the output voltage according to demanded electric power of the battery 2 and the electric load 3 and sends the transistor 27 a signal that corresponds to the target level of the output voltage. Accordingly, the target level of the output voltage is sent from the ECU 9 to the command output voltage setting circuit 14. The CPU 25 includes an engine power control unit 34 and a generator temperature measuring unit 35 in addition to the abnormality detecting circuit 31. The abnormality detecting circuit 31 examines the field current and the duty ratio and provides a warning signal if the examined field current and the duty ratio indicate disconnection or short-circuiting of the field coil.

The engine power control unit 34 executes a first engine power control process that controls engine power or engine torque according to the duty ratio or a second engine power control process that controls engine torque according to the amount of field current by switching these processes from one to the other. For example, an amount of fuel to be supplied to the engine, ignition timing for a gasoline engine or fuel injection timing for a diesel engine is calculated from a change in the duty ratio in the first engine power control process. In the second engine power control process, an amount of fuel to be supplied to the engine, ignition timing for a gasoline engine or fuel injection timing for a diesel engine is calculated from a change in the field current.

The generator temperature measuring unit 35 measures temperature of the generator 1 based on the field current and the duty ratio. The generator temperature measuring unit 35 includes a generator protection means for limiting the field current to an amount so that temperature of the generator 1 can be prevented from excessively rising.

Figure 2:
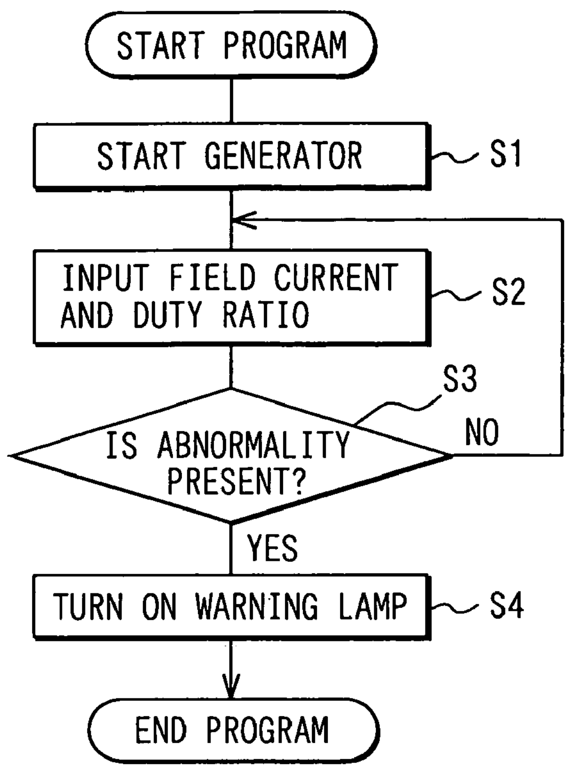
FIG. 2 is a flow diagram showing operation steps of detecting abnormality of a field coil of the vehicle generator according to the first embodiment.
Figure 3:
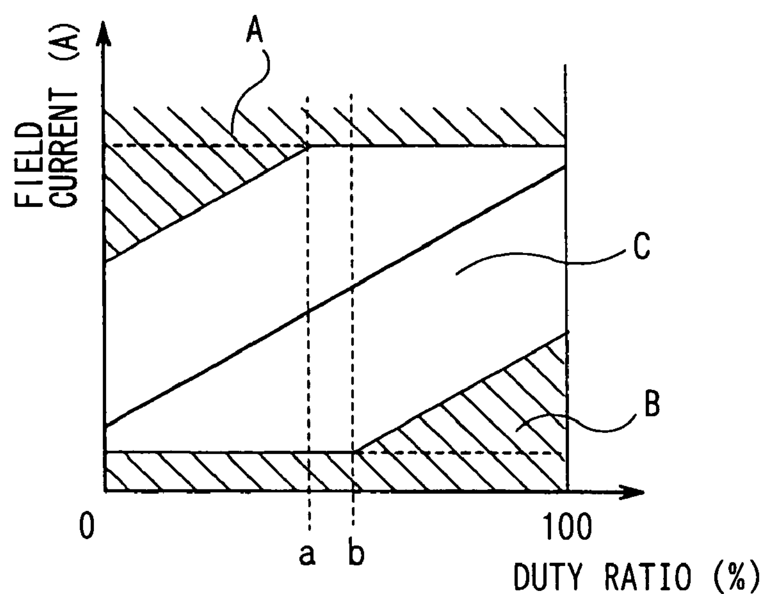
FIG. 3 is a schematic diagram of a map used for detecting abnormality of a field coil.

The abnormality detecting circuit 31 executes an abnormality detecting program shown in FIG. 2.

Firstly, the generator 1 is started at step S1. When an engine is started, the rotor with the field coil 5 starts rotating, so that the battery 2, the electric load 3, the ECU 9 and the voltage regulator 6 are charged or energized to operate. At step S2, an amount of actual field current and actual duty ratio are inputted to the CPU 25. Then, whether an abnormality is present or not is examined by a field coil abnormality examining map shown in FIG. 3, at step S3. The field coil abnormality examining map has abnormality regions A, B and a normal region C. If an amount of the actual field current and the actual duty ratio fall in one of the abnormality regions A, B, it is judged that an abnormality is present. If an amount of the actual field current and the actual duty ratio fall in the abnormality region A, it is judged that the field current is excessively large due to short-circuiting of the field coil 5 or the like. If an amount of the actual field current and the actual duty ratio fall in the abnormality region B, it is judged that the field current is excessively small due to disconnection of the field coil 5 or the like. There is an inclined straight border line between the abnormality region A and the normal region C at a portion where the duty ratio is smaller than a. There is another inclined straight border line between the abnormality region B and the normal region C at a portion where the duty ratio is smaller than b. The inclination of the border lines are set according to an operating condition of the generator 1, such as the temperature of the generator 1.

If it is judged that an abnormality is present (YES is provided at step S3), the program goes to step S4 to turn on the warning lamp 21. That is, if an abnormality is present on the field coil, the CPU 25 sends the transistor 32 a signal to turn on the warning lamp 21. In the meantime, the CPU 25 may send the command output voltage setting circuit 14 a signal to reduce or turn off the field current. If it is judged that an abnormality is not present (NO is provided at step S3), the program returns to step S2 to input an amount of actual field current and actual duty ratio to the CPU 25.

Figure 4:
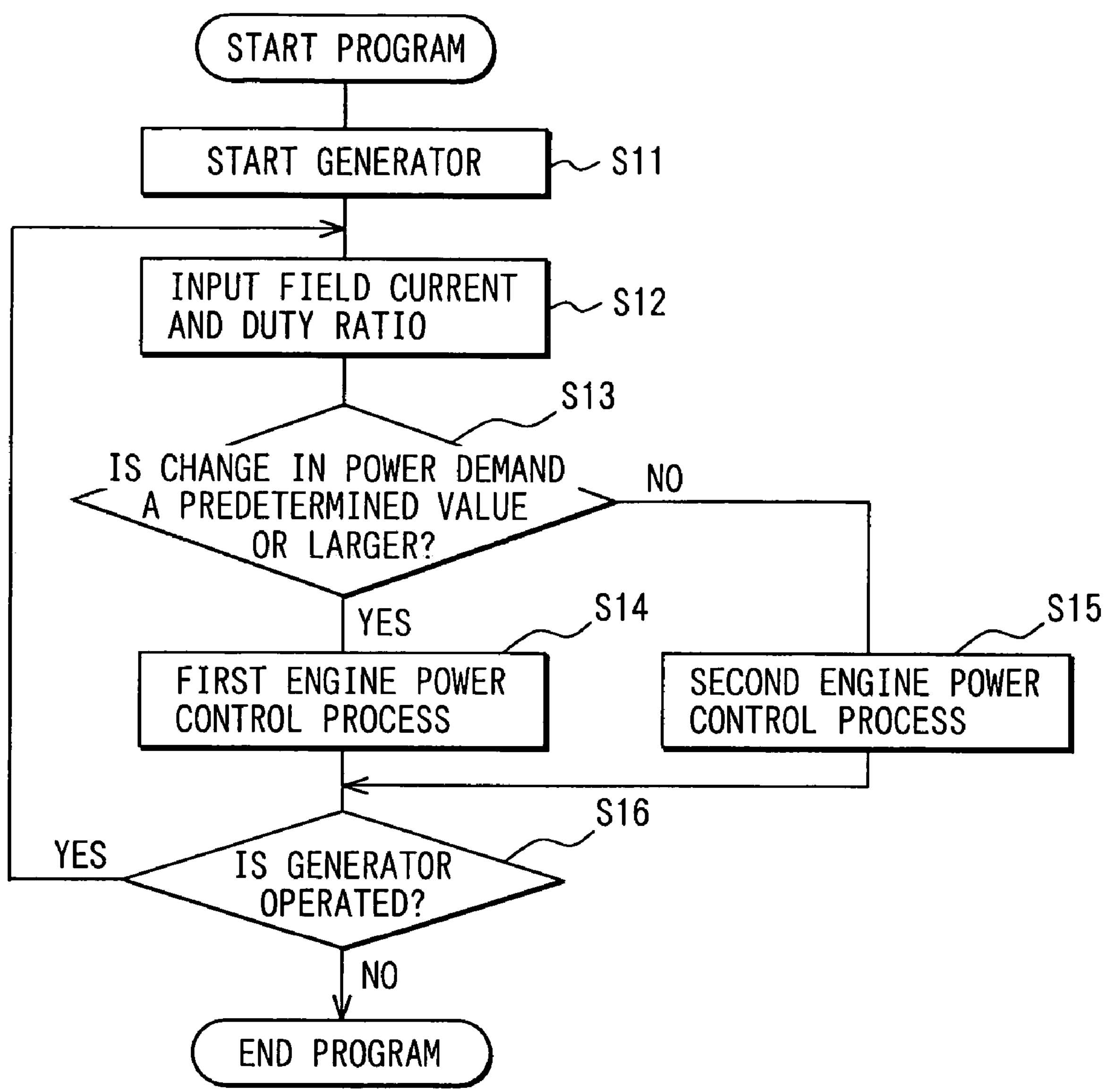
FIG. 4 is a flow diagram showing operation steps of controlling engine power.

The engine power control unit 34 executes an engine power control program shown in FIG. 4.

At step S11, the generator 1 is started. Then, an amount of actual field current and actual duty ratio are inputted to the CPU 25, at step S12. Thereafter, whether a change in the demanded electric power of the battery 2 and the electric load 3 is larger than a predetermined value or not is examined at step S13. In other words, an absolute value of the change in the demanded electric power per a unit time is compared with the predetermined value.

If it is judged that the change in the demanded electric power is equal to or larger than the predetermined value (YES is provided), the program goes to step S14, where the engine power is controlled by the first engine power control process. If it is judged that the change in the demanded electric power is smaller than the predetermined value (NO is provided), the program goes to step S15, where the engine power is controlled by the second engine power control process. Then, whether the generator 1 is continuously operating or not is examined at step S16. If YES is provided, the program returns to step S12 to get the data of the actual field current and duty ratio.

Figure 5:
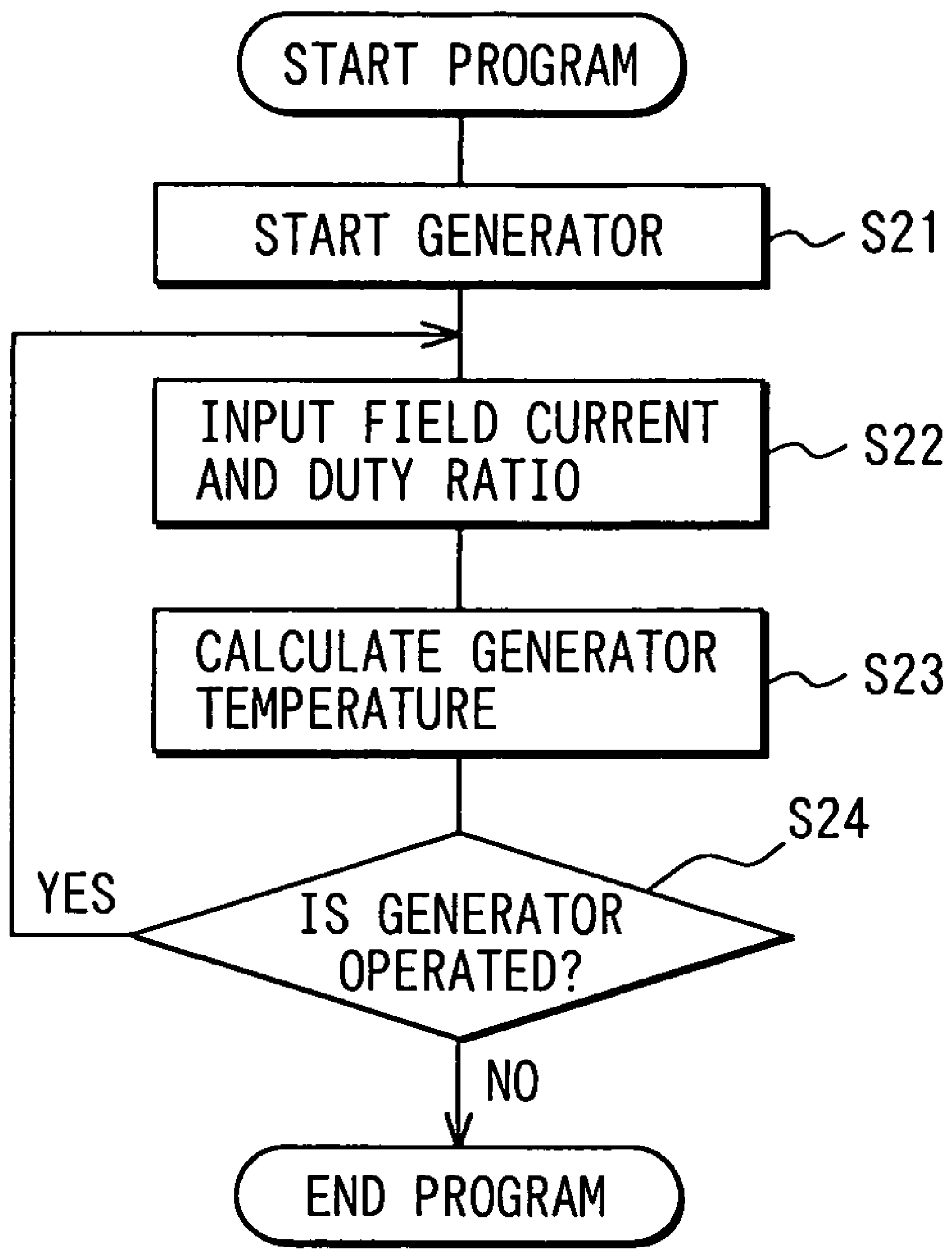
FIG. 5 is a flow diagram showing operation steps o detecting temperature of a vehicle generator.

The generator temperature measuring unit 35 executes a generator temperature measuring program shown in FIG. 5.

At step S21, the generator is started. Then, actual data of the field current and the duty ratio are inputted to the CPU 25 at step S22. At the subsequent step S23, the generator temperature is calculated from the data by means of a well-known type map (not shown) that relates the generator temperature, the amount of the field current and the duty ratio. Thereafter, whether the generator is continuously operating or not is examine at step S24. The program returns to S22 to input the CPU 25 the actual data of the field current and the duty ratio if the result is YES. Incidentally, the signal indicating the generator temperature is provided by the generator temperature measuring unit 35 to set the target amount of the field current and to control engine power according to the generator temperature.

Figure 6A:
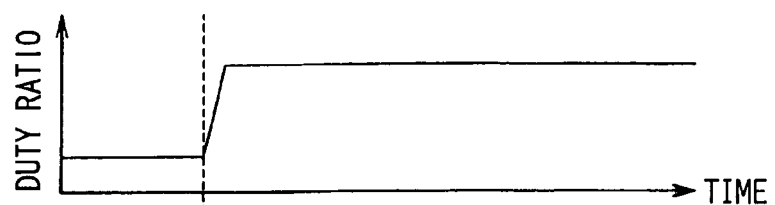
FIGS. 6A, 6B and 6C are time charts showing a transition of duty ratios, amounts of field current and levels of engine power.
Figure 6B:
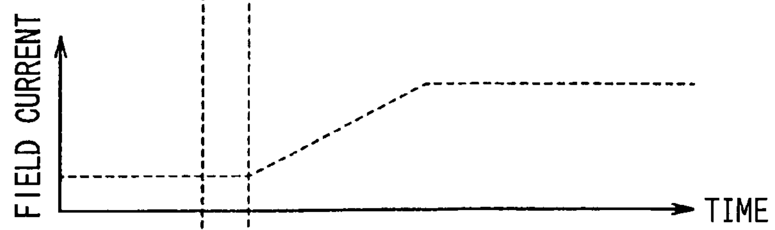
Figure 6C:
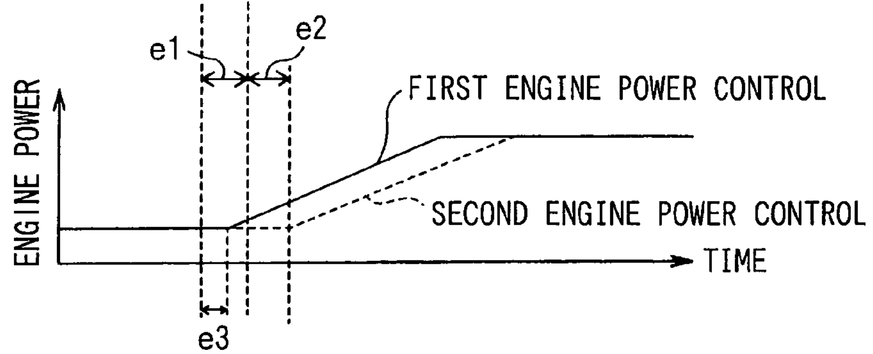

The engine power is controlled according to the duty ratio, as shown in FIG. 6A. The field current starts changing, as shown in FIG. 6B, by a delay time e1 after the duty ratio changes. The engine power, if controlled by the second engine power control process, starts changing by a delay time e2 after the field current starts changing, as shown in FIG. 6C. If the engine power is controlled by the first engine power control process, the engine power starts changing by a delay time e3 after the duty ratio starts changing, and the delay time e3 is much shorter than the sum of the delay times e1 and e2.

Accordingly, the engine power is controlled by the first engine power control process if the demand power changes abruptly or frequently. However, the engine power controlled by the first engine power control process may become unstable as it follows very small changes in the demand power. Therefore, the engine power is controlled by the second power control process if the demand power changes mildly or infrequently.

The amount of the field current changes according to the duty ratio as the generator temperature changes. Therefore, the generator temperature can be measured by means of the map or the like that relates the generator temperature, the field current and the duty ratio, without using an additional temperature sensor.

Figure 7:
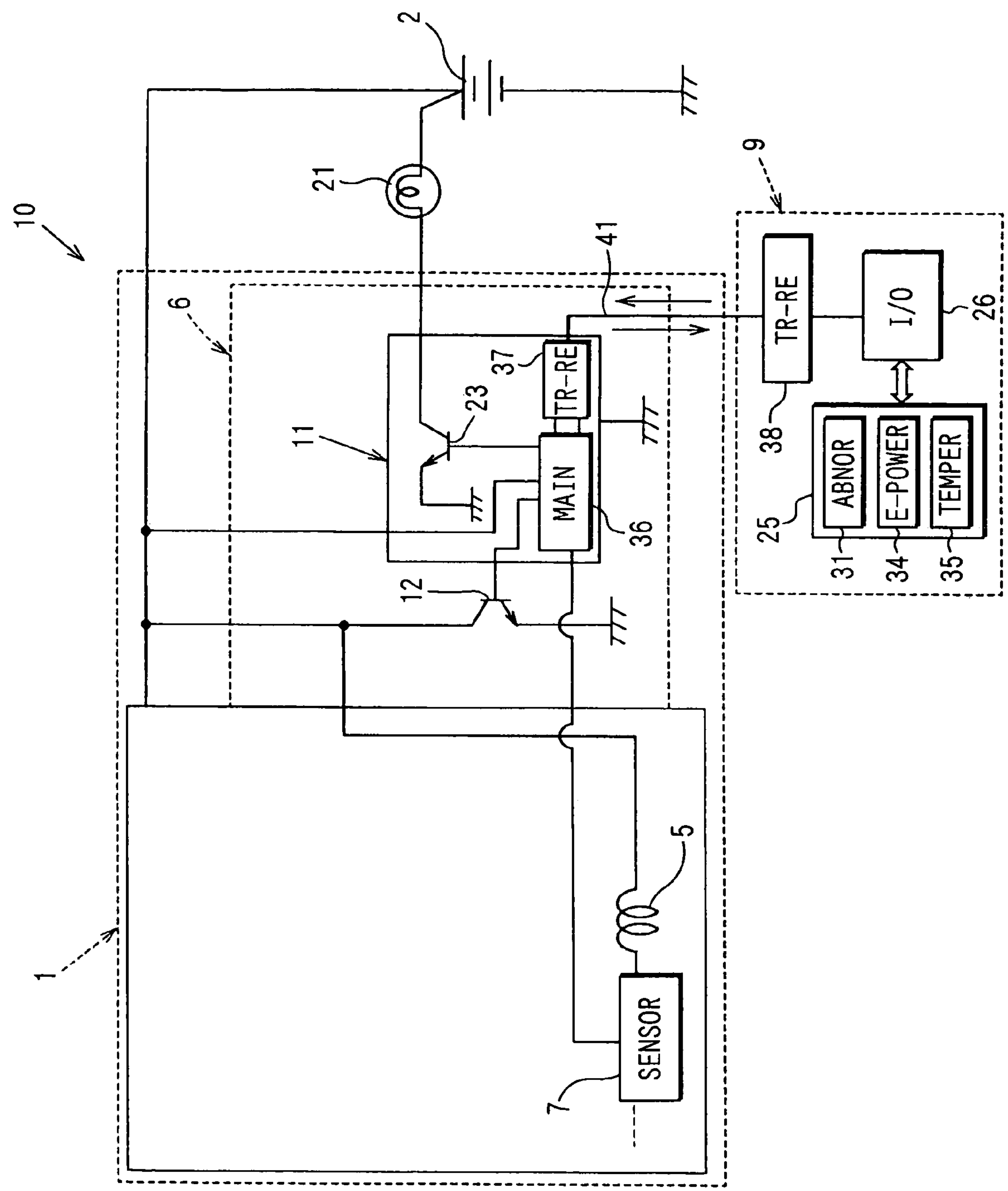
FIG. 7 is a schematic circuit diagram showing a main portion of a vehicle generator according to the second embodiment of the invention.

A generator according to the second embodiment of the invention will be described with reference to FIG. 7. Incidentally, the same reference numeral indicates the same or substantially the same part, portion or component as the first embodiment.

The control circuit 11 includes a transmitting-receiving circuit 37 in addition to the main circuit 36 that includes the command output voltage setting circuit 14, the actual field current detecting circuit 15, the driver circuit 16, the duty ratio signal transmitting circuit 17, the actual output voltage detecting circuit 18, the command field current setting circuit 19 and the warning circuit 22. The transmitting-receiving circuit 37 provides a serial composite signal of the field current signal and the driving signal, which are provided by the main circuit 36. The ECU 9 has a transmitting-receiving circuit 38 that receives the serial signal from the transmitting-receiving circuit 37. The transmitting-receiving circuit 37 transmits a digital-coded serial signal representing an amount of actual field current and an actual duty ratio to the ECU 9 and receives digital-coded data from the ECU 9 via a single signal line 41.

It is possible to control the generator 1 by a target amount of the field current instead of controlling the generator 1 by the target level of the output voltage. It is possible to provide the voltage regulator with a microcomputer that performs instead of the abnormality detecting circuit 31, the engine power control unit 34 and generator temperature measuring unit 35 of the ECU 9. In this case, the warning lamp 21 can be operated by the warning circuit 22 and the transistor 23.

The engine power control unit 34 may switch one of the first engine power control process and the second engine power control process to the other according to the rotation speed of the engine instead of the amount of field current. If a change in the rotation speed is larger than a preset value, the engine power control unit 34 executes the first engine power control process. Otherwise, the second control process is executed.

In the foregoing description of the present invention, the invention has been disclosed with reference to specific embodiments thereof. It will, however, be evident that various modifications and changes may be made to the specific embodiments of the present invention without departing from the scope of the invention as set forth in the appended claims. Accordingly, the description of the present invention is to be regarded in an illustrative, rather than a restrictive, sense.

What is claimed is:

1. A generator for a vehicle that includes a field coil and an armature coil and driven by an engine comprising:

a voltage regulator that supplies field current to the field coil at a variable duty ratio;

a field current sensor that detects field current; and a signal transmitting circuit that transmits a signal representing the detected field current and the duty ratio, wherein said signal transmitting circuit comprises a serial signal transmitting circuit that transmits a composite signal representing the detected field current and the duty ratio.

2. A vehicle generating system comprising the generator as claimed in claim 1 and an electronically controlling unit that receives the signal representing the detected field current and the duty ratio and controls the engine according to one of the detected field current and the duty ratio.

3. The vehicle generating system as claimed in claim 2 further comprising an abnormality detecting circuit that provides a warning signal if the field current and the duty ratio indicate an abnormality.

4. The vehicle generating system as claimed in claim 2, wherein said electronically controlling unit includes a first engine power control process that controls according to the duty ratio and a second engine power control process that controls according to the field current and means for switching the first and second engine power control processes from one to the other according to an engine condition.

5. The vehicle generating system as claimed in claim 2 further comprising a generator temperature measuring circuit according to the field current and the duty ratio.

6. The vehicle generating system as claimed in claim 4, wherein said means switches to said first engine power control process if demand power changes abruptly or frequently.

* * * * *